Aug. 21, 1962 R. D. WEHR Re. 25,228

APPARATUS FOR EXTRACTING JUICE FROM CITRUS FRUITS

Original Filed Dec. 30, 1958 5 Sheets-Sheet 1

INVENTOR
Robert D. Wehr

BY Burns, Doane, Benedict & Irons
ATTORNEYS

APPARATUS FOR EXTRACTING JUICE FROM CITRUS FRUITS

Original Filed Dec. 30, 1958 5 Sheets-Sheet 2

INVENTOR
Robert D. Wehr

BY Burns, Doane, Benedict & Ilvans
ATTORNEYS

Aug. 21, 1962 R. D. WEHR Re. 25,228

APPARATUS FOR EXTRACTING JUICE FROM CITRUS FRUITS

Original Filed Dec. 30, 1958

5 Sheets-Sheet 3

INVENTOR

Robert D. Wehr

BY Burns, Doane, Benedict & Irons

ATTORNEYS

APPARATUS FOR EXTRACTING JUICE FROM CITRUS FRUITS

Original Filed Dec. 30, 1958 5 Sheets-Sheet 4

INVENTOR
Robert D. Wehr

BY Burns, Doane, Benedict & Ilrons
ATTORNEYS

APPARATUS FOR EXTRACTING JUICE FROM CITRUS FRUITS

Original Filed Dec. 30, 1958 5 Sheets-Sheet 5

INVENTOR
Robert D. Wehr

BY Burns, Doane, Benedict & Irons
ATTORNEYS

United States Patent Office

Re. 25,228
Reissued Aug. 21, 1962

25,228
APPARATUS FOR EXTRACTING JUICE FROM CITRUS FRUITS

Robert D. Wehr, Lakeland, Fla., assignor to Anderson Bros. Manufacturing Co., Rockford, Ill., a corporation of Illinois Original No. 2,945,431, dated July 19, 1960, Ser. No. 783,737, Dec. 30, 1958. Application for reissue July 13, 1961, Ser. No. 126,439
11 Claims. (Cl. 100—97)

Matter enclosed in heavy brackets [ ] appears in the original patent but forms no part of this reissue specification; matter printed in italics indicates the additions made by reissue.

The present invention relates to apparatus for extracting juice from citrus fruits.

It is known that the outer peel of citrus fruit contains oil which, if permitted to contaminate the juice in excess amounts, adversely effects the flavor and keeping qualities of the juice. It is also known that the juice must be extracted in a manner which will prevent contamination with impurities other than oil from the peels. From the standpoint of economy, it is essential that juice extracting apparatus be capable of handling large quantities of fruit without requiring excessive investment. It is also advantageous for citrus juice extracting apparatus to be capable of handling fruit of assorted sizes to eliminate the necessity of prior grading of the fruit according to size.

The apparatus of the present invention is intended to meet the foregoing requirements. The apparatus may be briefly described as comprising a pair of parallel feed rollers which are rotated in synchronism in opposite directions and which have matching fruit-receiving cavities in their surfaces.

Individual whole fruits are received in those cavities and advanced past a stationary cutting blade which slices the fruit in half. Each half fruit is then subjected to a squeezing action while its cut face is in engagement with a perforated strainer plate. The squeezing action on each half fruit is accomplished by a pair of opposed disks which are rotated about axes extending at an angle to each other. Novel means are provided to assure that the fruit halves are properly positioned in the squeezing zone.

One of the primary objects of the invention is to provide citrus juice extracting equipment which, although of simple and rugged construction, will handle large quantities of fruit per unit of time.

Another object of the invention is to provide apparatus which will produce citrus juice which is not contaminated by excessive peel oil.

A further object of the invention is to provide apparatus which is capable of effectively extracting the juice from citrus fruit of assorted sizes.

Other objects and advantages of the invention will be referred to in the following detailed description of an exemplary form of apparatus embodying the invention. This description has reference to the accompanying drawings wherein.

Figure 1:
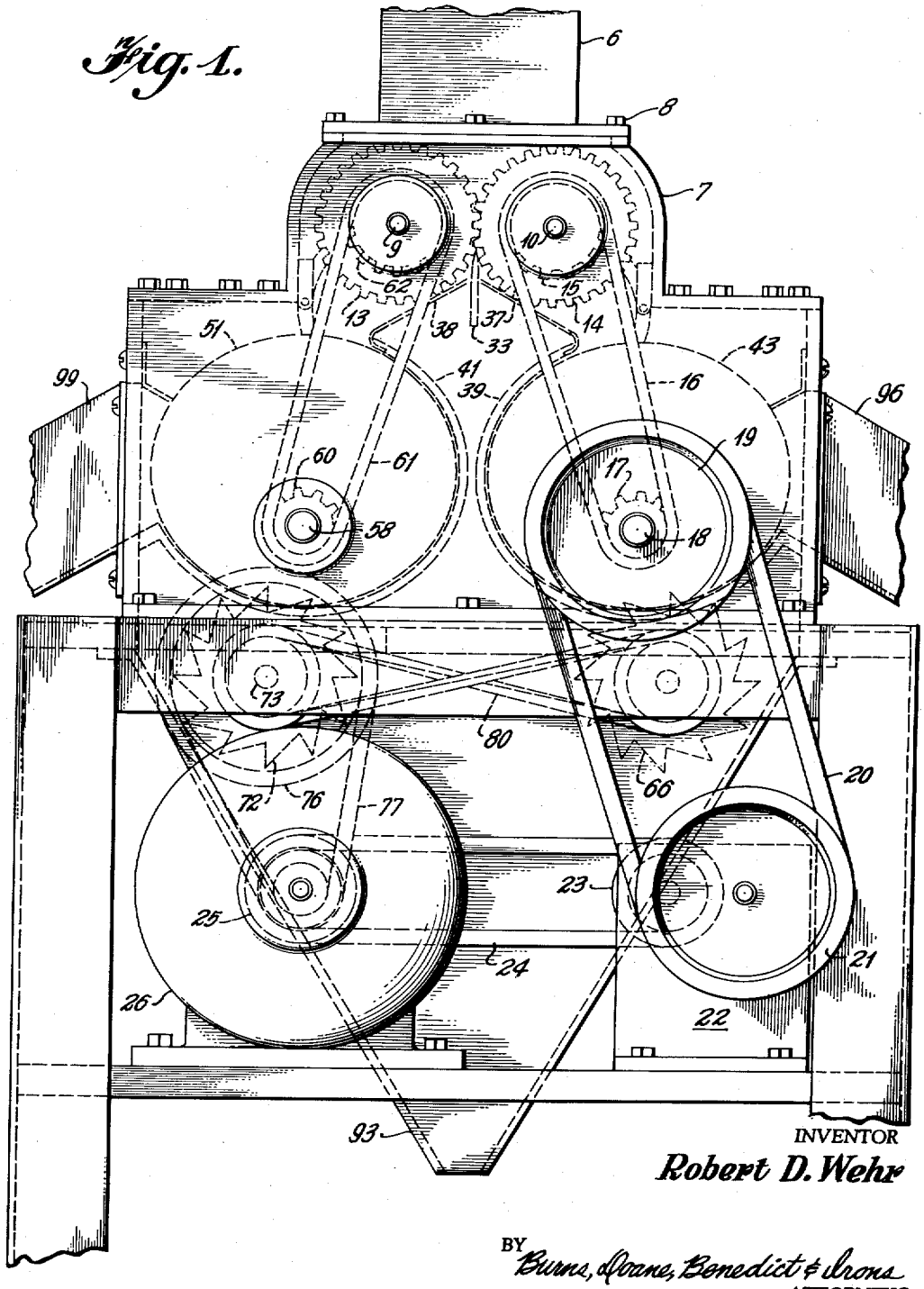
FIGURE 1 is a side elevational view of apparatus embodying the invention.
Figure 2:
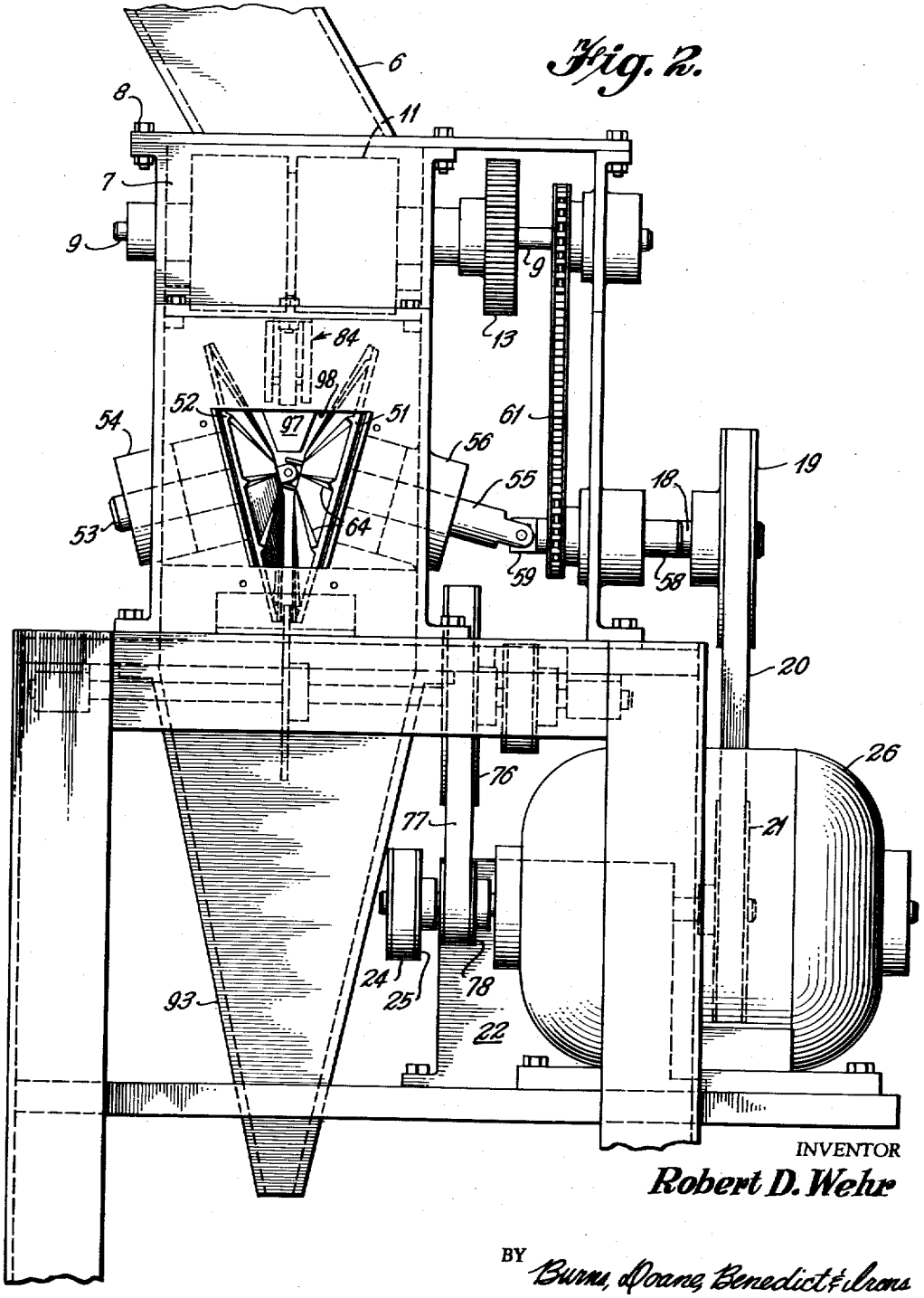
FIGURE 2 is an end elevational view of the apparatus.

Citrus fruits are fed downwardly through a chute 6 which is secured to a housing 7 of the apparatus by means of bolts 8. Parallel shafts 9 and 10 are rotatably mounted in suitable bearings in the housing 7. A roller 11 is fixed to the shaft 9 within the housing and a similar roller 12 is fixed to the shaft 10. The rollers 11 and 12 are driven in synchronism in opposite directions by spur gears 13 and 14 secured to the shafts 9 and 10, respectively. A sprocket 15 secured to the shaft 10 is driven by a chain 16 from a sprocket 17. The sprocket 17 is fixed on a shaft 18. Also fixed to that shaft is a pulley 19 which is driven by a belt 20. The belt 20 is driven by the output pulley 21 of a gear reduction unit 22 having an input pulley 23 driven by belt 24 from the pulley 25 of a motor 26.

The roller 11 has fruit-receiving cavities 27 and 28 in its surface. The roller 12 has similar fruit-receiving cavities 29 and 30 in its surface. It will be seen from FIGURE 3 that the fruit-receiving cavities 27 and 29 are in matching positions and that the fruit-receiving cavities 28 and 30 will be in matching positions when the rollers 11 and 12 have been rotated through one-half revolution in the direction of the arrows in FIGURE 3. By reference to FIGURES 3 and 4, it will be seen that the fruit-receiving cavities are deeper and wider at their forward ends. This is regarded as an important feature of the invention in that it enables larger fruit to occupy forward positions in the matching cavities and permits smaller fruit to be firmly held by the rearward portions of the cavities. The roller 11 has a circumferential groove 31 and the roller 12 has a similar circumferential groove 32. The grooves 31 and 32 are interrupted by the cavities in their respective rollers. The function of the grooves 31 and 32 is hereinafter described.

A stationary, horizontally disposed cutting blade 33 is secured to the housing 7 by means of brackets 34 and screws 35. The upper cutting edge 36 of the blade 33 is positioned slightly below a horizontal plane passing through the axes of the shafts 9 and 10.

A downwardly sloping ramp 37 is positioned on one side of the blade 33 and a similar downwardly sloping ramp 38 is positioned on the opposite side thereof. A stainer plate 39 having a perforated portion 40 extends from the lower end of the ramp 37 in juxtaposition to a pair of squeezing disks hereinafter described. A similar strainer plate 41 having a perforated portion 42 extends from the lower end of the ramp 38 in juxtaposition to another pair of squeezing disks.

Figure 5:
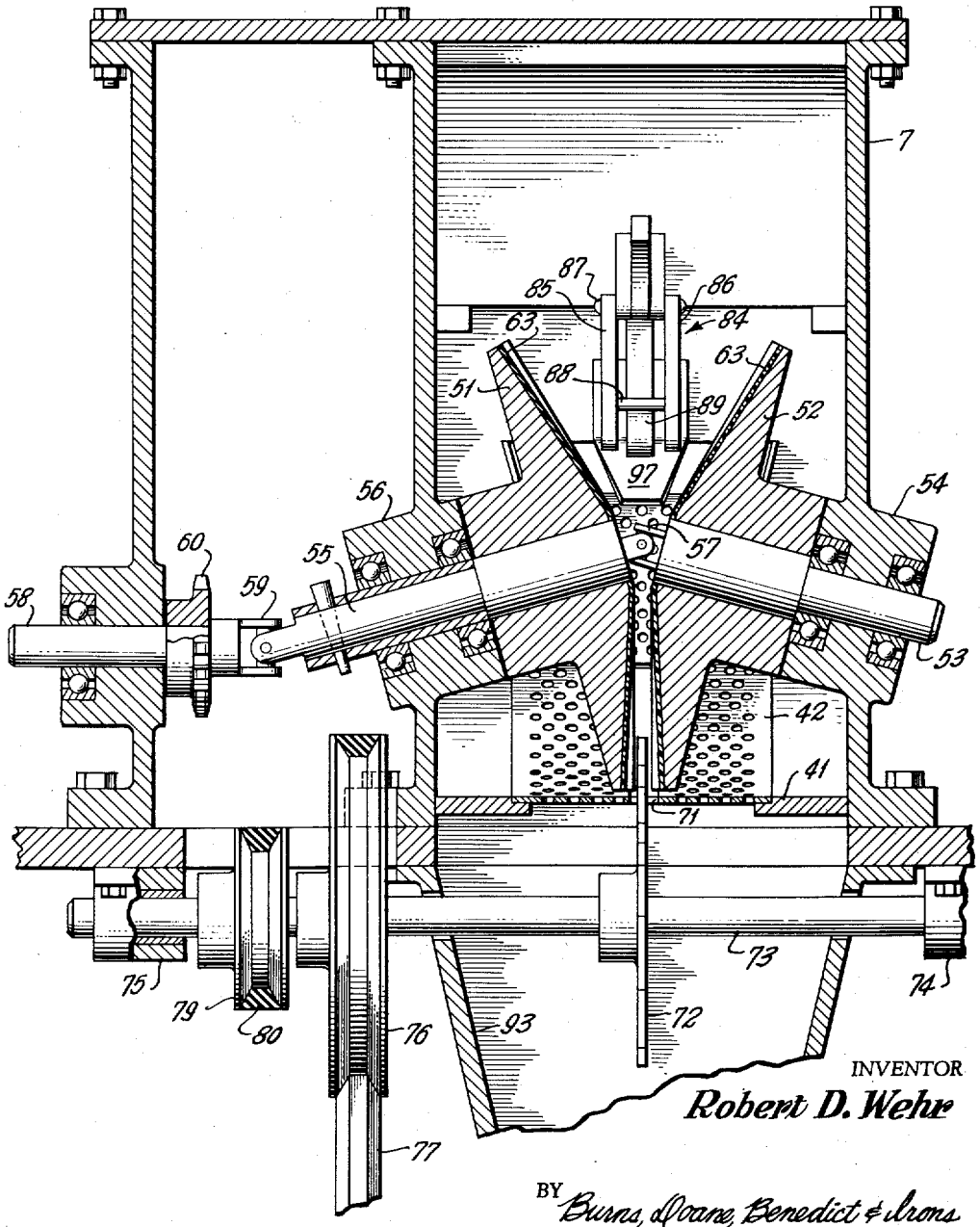
FIGURE 5 is a sectional view taken generally in the direction of the arrows along the line 5—5 of FIGURE 3.

Associated with the strainer plate 39 are a pair of frusto-conical squeezing disks 43 and 44. The disk 44 is carried by a downwarly and outwardly extending stub shaft 45 which is rotatable in an angularly disposed bearing 46 in the housing 7. The disk 43 is carried by a downwardly and outwardly extending shaft 47 which is rotatable in an angularly disposed bearing 48 in the housing. The disks 43 and 44 are connected to each other by means of a universal joint 49 so that the disks will rotate in unison in the same direction. The shaft 47 is coupled to the shaft 18 by a universal joint 50. Similar frusto-conical disks 51 and 52 are associated with the strainer plate 41. The disk 52 is carried by a stub shaft 53 which extends downwardly and outwardly as best shown in FIGURE 5 and which is mounted in an angularly disposed bearing 54 in the housing 7. The disk 51 is carried by a shaft 55 which is rotatable in an angularly disposed bearing 56. The disks 51 and 52 are coupled to each other by means of a universal joint 57. The shaft 55 is coupled to a short shaft 58 by means of a universal joint 59. The shaft 58 is driven by a sprocket 60 which is in turn driven by a chain 61. The chain 61 is driven by a sprocket 62 which is fixed to the shaft 9. The shaft 9 is driven as described above.

The inner faces of the squeezing disks 43, 44, 51 and 52 are preferably covered with a layer of resilient material such as neoprene, indicated at 63. The inner faces of the squeezing disks are also provided with generally radially extending ribs 64.

The perforated portion 40 of the strainer plate 39 is slotted at 65 to receive the periphery of a toothed circular cutter 66. The cutter 66 is mounted on a shaft 67 which is rotatable in bearings 68 and 69 by means of a pulley 70. The perforated portion 42 of the strainer plate 41 is similarly slotted at 71 to receive the periphery of a circular toothed cutter 72. The cutter 72 is fixed to a shaft 73 which is rotatable in bearings 74 and 75 by means of a pulley 76. The pulley 76 is driven by a belt 77 which is in turn driven by a pulley 78 on a shaft of the motor 26. A pulley 79 is also fixed to the shaft 73 and drives the pulley 70 on the shaft 67 by means of a crossed belt 80. The cutters 66 and 72 will thus be driven in opposite directions.

Figure 3:
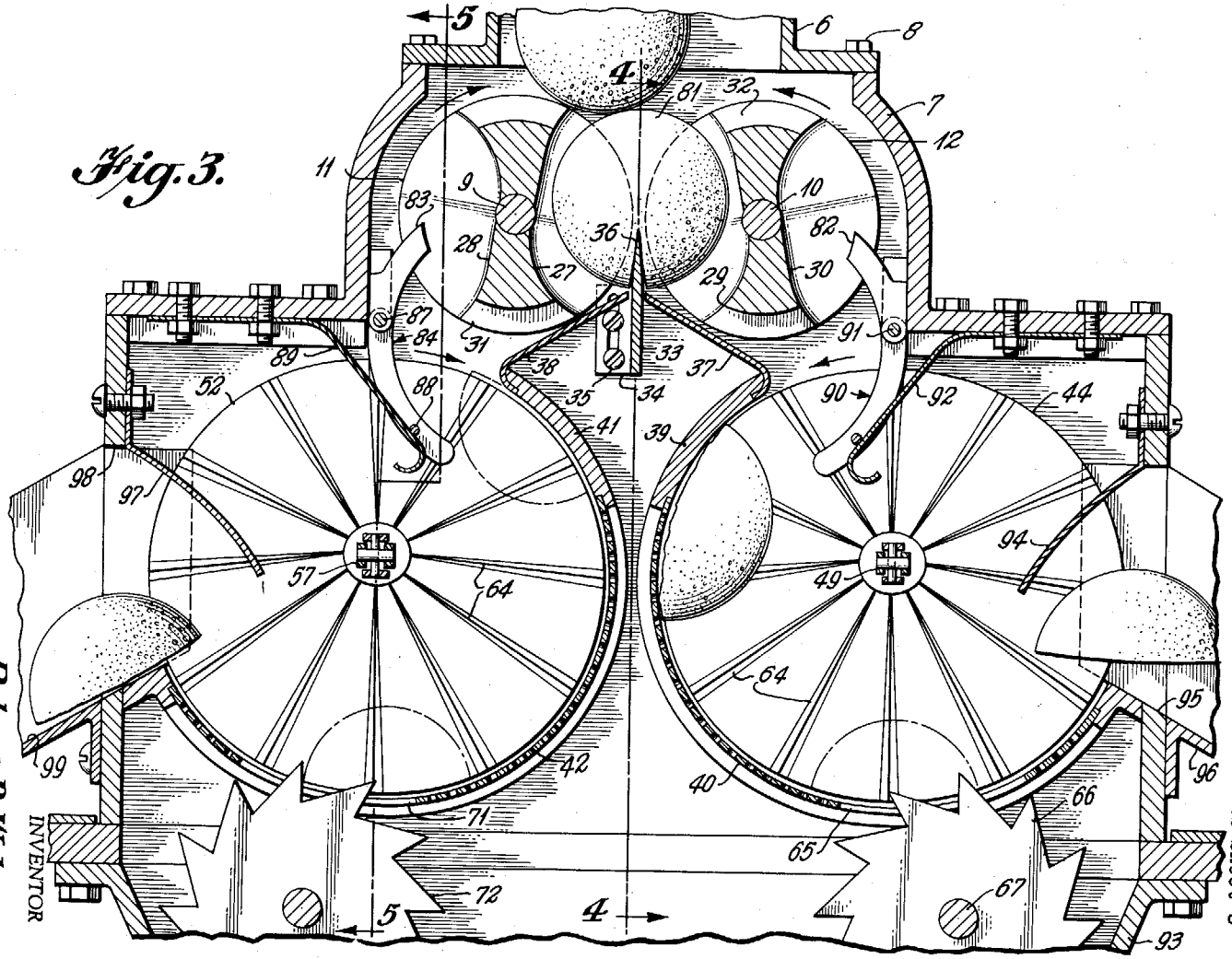
FIGURE 3 is an enlarged vertical and longitudinal sectional view through approximately the center of the apparatus.
Figure 4:
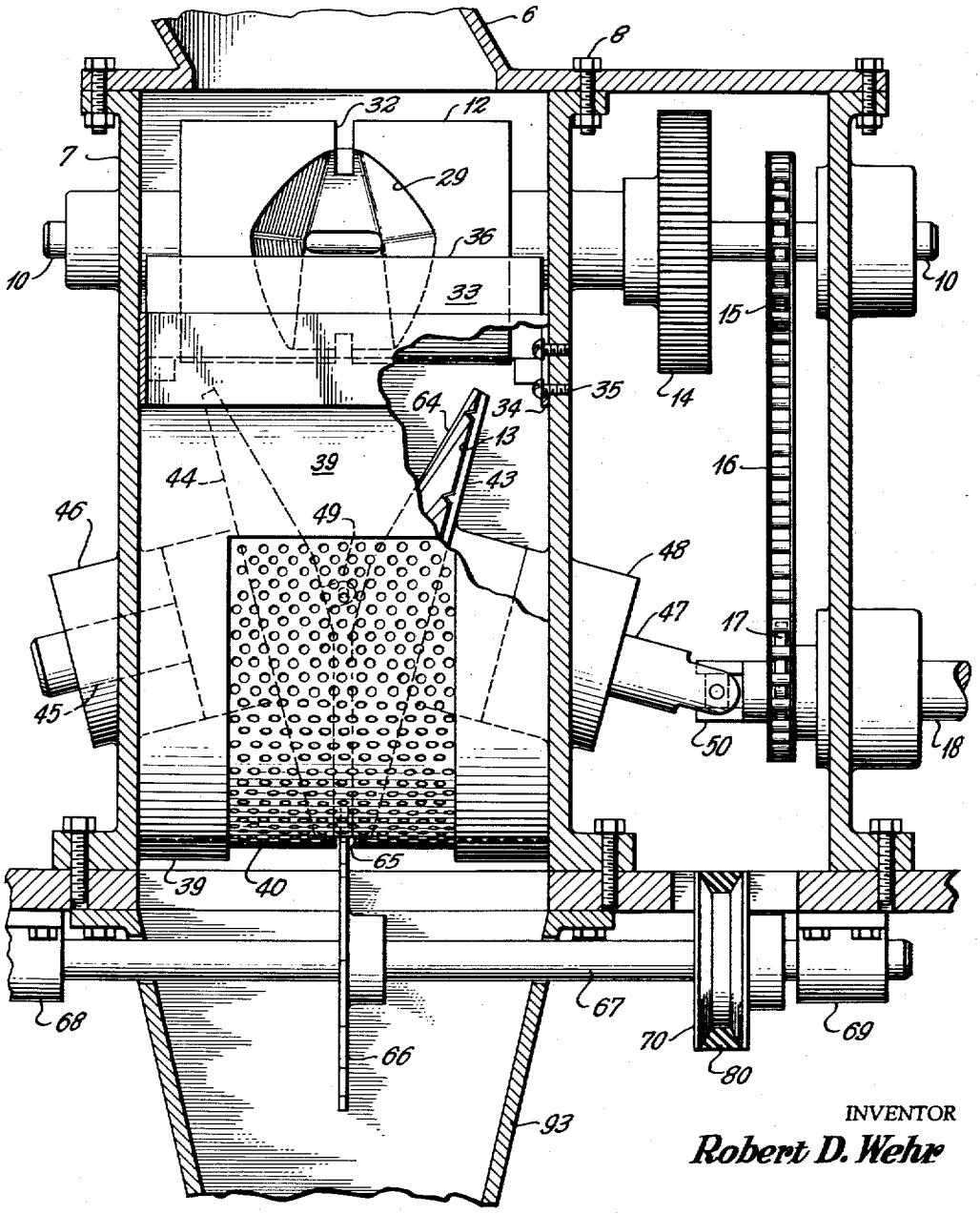
FIGURE 4 is a vertical sectional view taken in the direction of the arrows along the line 4—4 of FIGURE 3.

Fruit from the chute 6 will be received in matching cavities of the rollers 11 and 12. One such fruit is illustrated at 81 in FIGURE 3 as occupying a position within the cavities 27 and 29. As the rollers 11 and 12 rotate, the fruit 81 is sliced in half by the blade 33. One-half of the fruit descends along the ramp 37 and the other half descends along the ramp 38. The half of the fruit descending along the ramp 37 will be ejected from the cavity 29 by a stationary fruit ejecting finger 82 fixed to the housing 7. It will be seen that the upper end of the fruit ejecting finger 82 is received within groove 32 on roller 12. The fruit half descending along the ramp 38 will be ejected from the cavity 27 by a similar fruit ejecting finger 83 which is fixed to the housing 7 and which has its upper end received in the groove 31 on roller 11. The fruit half ejected from the cavity 27 strikes a resiliently mounted deflection member 84. As best illustrated in FIGURE 5, the deflection member 84 consists of spaced side members 85 and 86 which are pivotally mounted to the housing 7 by a pivot pin 87. A rigid pin 88 joins the side members 85 and 86 near their lower ends. A cantilever spring member 89 engages the pin 88 and urges the deflection member 84 toward the right as seen in FIGURE 3. A fruit half ejected from the cavity 29 strikes a similar deflection member 90 which is pivoted at 91 and provided with a cantilever spring member 92 which urges this deflection member toward the left as seen in FIGURE 3. The deflection member 84 causes the fruit half ejected from th cavity 27 to be positioned with its cut face lightly engaging the strainer plate 41. The deflection member 90 similarly causes the fruit half ejected from the cavity 29 to be positioned with its cut face lightly engaging the strainer plate 39. The cantilever spring members 89 and 92 exert small forces on the deflection members 84 and 90.

As the squeezing disks rotate, the fruit halves are squeezed or compressed due to the fact that the opposing surfaces of the disks are closer together at the bottom of the disks than at the top. The juice is thus extracted from the fruit halves and escapes through the perforated portions 40 and 42 of the strainer plates to be discharged through a juice spout 93. Pulp adhering to the squeezed fruit halves is separated therefrom by the toothed cutters 66 and 72. The squeezed peels between the disks 43 and 44 continue to follow those disks until they strike a peel kick-out meember 94 which discharges them through an opening 95 in the housing 7 and onto a peel discharge chute 96. A similar peel kick-out member 97 removes peels from between the disks 51 and 52 through an opening 98 and onto a chute 99.

The apparatus is compact and can be operated at high speed. There is no necessity for grading the fruit according to size before feeding it to the apparatus. The resilient working faces of the rotating disks prevent excessive bruising of the peel and excessive contamination of the juice with peel oil.

I have illustrated and described what I now consider to be the preferred embodiment of the invention. It will be understood that modifications may be resorted to without departing from the broader scope of the invention as defined by the claims.

Having thus described my invention, I claim:

1. Apparatus for extracting juice from citrus fruit comprising a pair of horizontally disposed rollers having horizontally spaced, parallel axes, means for rotating said rollers in synchronism in opposite directions, said rollers having matching fruit receiving cavities in their peripheral surfaces for receiving whole fruit and advancing the same between the rollers, a stationary cutting blade lying in a plane parallel to the axes of said rollers and positioned in the path of fruit passing between the rollers to slice such fruit in half, a pair of opposed, generally frusto-conical disks positioned below and on each side of said blade with the tapering surfaces of the disks of each pair facing each other, means for rotating said disks of each pair about axes extending outwardly and downwardly from the larger ends thereof to position the tapering surface of the disks of each pair closer together at their lower positions than at their upper positions to provide a squeezing action on fruit halves descending between each pair of rotating disks, a downwardly sloping ramp on each side of said blade for engaging the cut faces of the fruit halves and guiding such fruit halves between the upper portions of said disks, a curved and perforated strainer plate extending from the end of each of said ramps around the lower portions of the peripheries of the adjacent pair of disks, and a deflection member positioned between the upper portions of each pair of disks in the paths of fruit halves leaving the lower ends of said ramps for deflecting such fruit halves to position the cut faces thereof in engagement with said strainer plates.

2. Apparatus for extracting juice from citrus fruit comprising a pair of parallel, horizontally disposed rollers having horizontally spaced, parallel axes, means for rotating said rollers in synchronism in opposite directions, said rollers having matching fruit receiving cavities in their peripheral surfaces for receiving whole fruit and advancing the same between the rollers, said cavities being of lesser dimension longitudinally of the rollers at their trailing edges than at their leading edges, a stationary cuitting blade lying in a plane parallel to the axes of said rollers and positioned in the path of fruit passing between the rollers to slice such fruit in half, a pair of opposed, generally frusto-conical disks positioned below and on each side of said blade with the tapering surfaces of the disks of each pair facing each other, means for rotating said disks of each pair about axes extending outwardly and downwardly from the larger ends thereof to position the tapering surfaces of the disks of each pair closer together at their lower portions than at their upper portions to provide a squeezing action on fruit halves descending between each pair of rotating disks, a downwardly sloping ramp on each side of said blade for engaging the cut faces of the fruit halves and guiding such fruit halves between the upper portions of said disks, a curved and perforated strainer plate extending from the end of each of said ramps around the lower portions of the peripheries of the adjacent pair of disks, and a deflection member positioned between the upper portions of each pair of disks in the paths of fruit halves leaving the lower ends of said ramps for deflecting such fruit halves to position the cut faces thereof in engagement with said strainer plates.

3. Apparatus for extracting juice from citrus fruit comprising a pair of horizontally disposed rollers having horizontally spaced, parallel axes, means for rotating said rollers in opposite directions in synchronism, said rollers having circumferential grooves in their peripheral surfaces and having matching fruit receiving cavities in their peripheral surfaces for receiving whole fruit and advancing the same between the rollers, said cavities interrupting the continuity of said grooves on said rollers, a stationary cutting blade lying in a plane parallel to the axes of said rollers and positioned in the path of fruit passing between the roller to slice such fruit in half, a pair of opposed, generally frusto-conical disks positioned below and on each side of blade with the tapering surfaces of the disks of each pair facing each other, means for rotating said disks of each pair about axes extending outwardly and downwardly from the larger ends thereof to position the tapering surfaces of the disks of each pair closer together at their lower portions than at their upper portions to provide a squeezing action on fruit halves descending between each pair of rotating disks, a downwardly sloping ramp on each side of said blade for engaging the cut faces of the fruit halves and guiding such fruit halves between the upper portions of said disks, a fruit ejecting finger positioned in the groove of each roller beyond the end of the associated ramp to eject fruit halves from said cavities, a curved and perforated strainer plate extending from the end of each of said ramps around the lower portions of the peripheries of the adjacent pair of disks, and a deflection member positioned between the upper portions of each pair of disks in the paths of fruit halves ejected from said cavities for deflecting such fruit halves to position the cut faces thereof in engagement with said strainer plates.

4. Apparatus for extracting juice from citrus fruit comprising a pair of horizontally disposed rollers having horizontally spaced, parallel axes, means for rotating said rollers in synchronism in opposite directions, said rollers having matching fruit receiving cavities in their peripheral surfaces for receiving whole fruit and advancing the same between the rollers, a stationary cutting blade lying in a plane parallel to the axes of said rollers and positioned in the path of fruit passing between the rollers to slice such fruit in half, a pair of opposed, generally frusto-conical disks positioned below and on each side of said with the tapering surfaces of the disks of each pair facing each other, means for rotating said disks of each pair about axes extending outwardly and downwardly from the larger ends thereof to position the tapering surfaces of the disks of each pair closer together at their lower portions than at their upper portions to provide a squeezing action on fruit halves descending between each pair of rotating disks, a downwardly sloping ramp on each side of said blade for engaging the cut faces of the fruit halves and guiding such fruit halves between the upper portions of said disks, a curved and perforated strainer plate extending from the end of each of said ramps around the lower portions of the peripheries of the adjacent pair of disks, a deflection member positioned between the upper portions of each pair of disks in the paths of fruit halves leaving the lower ends of said ramps for deflecting such fruit halves to position the cut faces thereof in engagement with said strainer plates, each of said strainer plates being slotted between the lower portions of said disks, and a rotating toothed cutter in each said slot for removing pulp squeezed from such fruit halves.

5. Apparatus for extracting juice from citrus fruit comprising a pair of horizontally disposed rollers having horizontally spaced, parallel axes, means for rotating said rollers in synchronism in opposite directions, said rollers having matching fruit receiving cavities in their peripheral surfaces for receiving whole fruit and advancing the same between the rollers, a stationary cutting blade lying in a plane parallel to the axes of said rollers and positioned in the path of fruit passing between the rollers to slice such fruit in half, a pair of opposed, generally frusto-conical disks positioned below and on each side of said blade with the tapering surfaces of the disks of each pair facing each other, means for rotating said disks of each pair about axes extending outwardly and downwardly from the larger ends thereof to position the tapering surfaces of the disks of each pair closer together at their lower portions than at their upper portions to provide a squeezing action fruit halves descending between each pair of rotating disks, a downwardly sloping ramp on each side of said blade for engaging the cut faces of the fruit halves and guiding such fruit halves between the upper portions of said disks, a curved and perforated strainer plate extending from the end of each of said ramps around the lower portions of the peripheries of the adjacent pair of disks, a deflection member positioned between the upper portions of each pair of disks in the paths of fruit halves leaving the lower ends of said ramps for deflecting such fruit halves to position the cut faces thereof in engagement with said strainer plates, and a peel pick-out member positioned between each pair of disks in advance of said deflection member therebetween.

*6. An apparatus for extracting juice from citrus fruit comprising first and second pairs of disks, each pair of disks having opposed faces, at least one disk of each pair having a generally conical face, said first pair of disks being arranged in closely spaced edge to edge relationship with said second pair of disks, means for mounting the disks of each pair with opposed faces thereof facing each other and the axes of the disks disposed at an angle with respect to each other in the same plane, such as to position one area of the faces of the disks in relatively closely spaced relationship along a line in said plane extending outwardly from the axes of the disks whereby the space between the disk faces progressively increases through 180° in each direction therefrom, means for feeding fruit to a point intermediate the pairs of disks, a cutting blade disposed in a plane approximately midway between the two pairs of disks for cutting a fruit in half for passage of one half of each fruit to one of said pairs of disks in an area where the faces of the disks are disposed in divergent relationship, with the uncut surfaces of the fruit halves extending toward the center of the disks, means for rotating the disks in a direction to carry the fruit halves through the area of closely spaced relationship to progressively compress the fruit and express the juice therefrom and to release the fruit after passage through said area and upon divergence of that portion of the disk faces engaging the fruit half.*

*7. Apparatus for extracting juice from citrus fruits comprising horizontally spaced pairs of disks having conical surfaces mounted with the tapering surfaces of the disks of each pair facing each other, means for rotating said disks of each pair about axes extending outwardly and donwardly from the larger end thereof to position the tapering surface of the disks of each pair closer together at their lower positions than at their upper positions to provide a squeezing action on fruit halves descending between each pair of rotating disks, means for feeding whole fruit to a position above and intermediate the pairs of disks, and a cutter disposed in the path of the fruit from cutting the same in half to pass one half of each fruit to each of the pairs of disks.*

*8. The combination of claim 6 wherein said disks are provided with radially directed corregations on the faces thereof.*

*9. The combination of claim 6 having means for engaging the fruit along the compressed cut edge thereof while the latter is disposed between the closely spaced areas of the disks to remove pulp expressed from the fruit during compression thereof.*

*10. The combination of claim 6 having rotating cutters positioned for engagement with the fruit along the compressed cut edge thereof while the fruit is disposed between the closely spaced areas of the disks to remove pulp expressed from the fruit during compression thereof.*

*11. The combination of claim 6 wherein the means for*

*mounting the disks of each pair are arranged to support the disks of each pair with the opposed faces thereof facing each other and the axes of the disks disposed at an angle with respect to each other in the same approximately vertical plane, such as to position one area of the faces of the disks in relatively closely spaced relationship along a line in said approximately vertical plane and a stationary segmental arcuate screen is disposed below each pair of disks extending annularly of said disks.*

References Cited in the file of this patent

UNITED STATES PATENTS

| | | |
|---|---|---|
| 271,161 | Treber | Jan. 23, 1883 |
| 2,205,059 | Clark | June 18, 1940 |
| 2,463,125 | Smith et al. | Mar. 1, 1949 |
| 2,515,749 | Wallace et al. | July 18, 1950 |
| 2,540,014 | Smith | Jan. 30, 1951 |
| 2,608,486 | Arndt | Aug. 22, 1952 |